United States Patent
Lee et al.

(10) Patent No.: US 6,498,975 B1
(45) Date of Patent: Dec. 24, 2002

(54) METHOD FOR CONTROLLING A TRANSFER CASE WHICH REACTS TO STEERING WHEEL ANGLE POSITION

(75) Inventors: Syun Kyung Lee, Ann Arbor, MI (US); Ashok Rodrigues, Farmington Hills, MI (US); John Glab, Riverview, MI (US); Dana Joseph Katinas, Novi, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/618,529

(22) Filed: Jul. 18, 2000

(51) Int. Cl.[7] ................................................. G06F 17/00
(52) U.S. Cl. ........................................... 701/69; 701/89
(58) Field of Search .............................. 701/41, 89, 36, 701/51, 67, 69, 72; 477/107, 110; 192/48.2, 48.8, 21.5; 180/247, 248, 421

(56) References Cited

U.S. PATENT DOCUMENTS

| | | | | |
|---|---|---|---|---|
| 4,776,424 A | * | 10/1988 | Naito | |
| 4,989,686 A | * | 2/1991 | Miller et al. | |
| 5,752,211 A | * | 5/1998 | Takasaki et al. | |
| 5,779,013 A | * | 7/1998 | Bansbach | |
| 6,062,330 A | * | 5/2000 | Watson et al. | |

* cited by examiner

Primary Examiner—William A. Cuchlinski, Jr.
Assistant Examiner—Edward Pipala
(74) Attorney, Agent, or Firm—F. G. McKenzie

(57) ABSTRACT

A transfer case control system or apparatus 10 is provided for use on a four-wheel drive vehicle of the type having a transfer case 32, a front driveshaft 22 and a rear driveshaft 26. Transfer case control system 10 includes a conventional microcontroller or controller 40 having a memory unit 42 and operating under stored program control. Controller 40 is communicatively coupled to sensors 44, 46, 48, and to transfer case 32. Controller 40 selectively transmits a torque control or minimum duty cycle signal to transfer case 32, which is at least partially based upon the angular position of the vehicle's steering wheel and the speed of driveshafts 22, 26.

19 Claims, 3 Drawing Sheets

METHOD FOR CONTROLLING A TRANSFER CASE WHICH REACTS TO STEERING WHEEL ANGLE POSITION

FIELD OF THE INVENTION

This invention relates to a method for controlling a transfer case and more particularly, to a method for controlling a transfer case within a four wheel drive vehicle which provides an improved response by monitoring and reacting to the position or angle of the vehicle's steering wheel.

BACKGROUND OF THE INVENTION

Four-wheel drive vehicles typically include a transfer case which selectively transfers torque and power from the vehicle's input shaft to a front and a rear driveshaft, thereby selectively rotating the front and rear driveshafts. The transfer case includes a conventional electromagnetic clutch assembly which typically and selectively transfers torque from a primary driveshaft (e.g., the rear driveshaft) to a secondary driveshaft (e.g., the front driveshaft), thereby reducing the torque provided to the primary driveshaft and increasing the torque provided to the secondary driveshaft. The clutch assembly is typically and communicatively coupled to a controller and/or control system which determines the amount of torque that is to be provided to the front and rear driveshafts (e.g., primary and secondary driveshafts), based upon vehicle sensory data, and which generates a control or command signal to the clutch assembly, thereby controlling the amount of torque which is provided to front and rear driveshafts. Particularly, in order to provide torque and traction to the front and rear wheels of the vehicle and to avoid relative slip between the front and rear wheels, the transfer case controller and/or control system typically monitor the speed of both the front and rear driveshafts and the position of the vehicle's throttle (i.e., "throttle position").

While these types of prior systems provide sufficient traction and control to the front and rear wheels of a vehicle in many situations, they suffer from some drawbacks. One drawback associated with these prior systems is that, while they typically monitor and react to the throttle position and the respective speeds of the front and rear wheels, they do not monitor the angle and/or position of the steering wheel of the vehicle. Hence, these systems do not adequately account for situations in which the front and rear wheel speeds naturally differ, such as when the vehicle is engaged in a turn. These prior systems must allow for an undesirable amount of slip to compensate for situations in which the vehicle is in a turn. As a result, these prior systems often allow slippage to occur between the front and rear wheels of the vehicle, or cause and/or suffer from undesirable noise and vibration harshness ("NVH"), which is perceived by the operator and/or passengers of the vehicle.

There is therefore a need for a method and an apparatus for controlling a transfer case within a four-wheel drive vehicle which provides an improved response by monitoring and considering the position or angle of the vehicle's steering wheel.

SUMMARY OF THE INVENTION

It is a first object of the invention to provide a method and an apparatus for controlling a transfer case within a four-wheel drive vehicle which overcomes at least some of the previously delineated drawbacks of the prior systems, devices, and/or methods.

It is a second object of the invention to provide a method and an apparatus for controlling a transfer case within a four-wheel drive vehicle which monitors and desirably reacts to the position or angle of the vehicle's steering wheel.

According to a first aspect of the present invention, a system for controlling a transfer case is provided. The transfer case is operatively disposed within a four-wheel drive vehicle of the type having a steering wheel and a primary and a secondary driveshaft, and is effective to selectively transfer torque between the primary and secondary driveshafts. The system includes a sensor which senses an angle in which the steering wheel is positioned and which generates at least one signal representing the sensed angle; and a controller which is communicatively coupled to the transfer case and to the sensor, which receives the at least one signal and which utilizes the at least one signal to selectively generate an output signal which is based upon the sensed angle and which is effective to selectively control the torque which is transferred to the primary and secondary driveshafts.

According to a second aspect of the present invention, a method is provided for controlling a transfer case which is operatively disposed within a four wheel drive vehicle. The vehicle is of the type having a selectively positionable steering wheel, a front driveshaft and a rear driveshaft. The transfer case is adapted to selectively provide torque to the front and rear driveshafts. The method comprises the steps of: determining an angular position of the steering wheel; using the angular position to calculate a minimum duty cycle value; and selectively providing the minimum duty cycle value to the transfer case, effective to alter the torque provided to the front and rear driveshafts.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
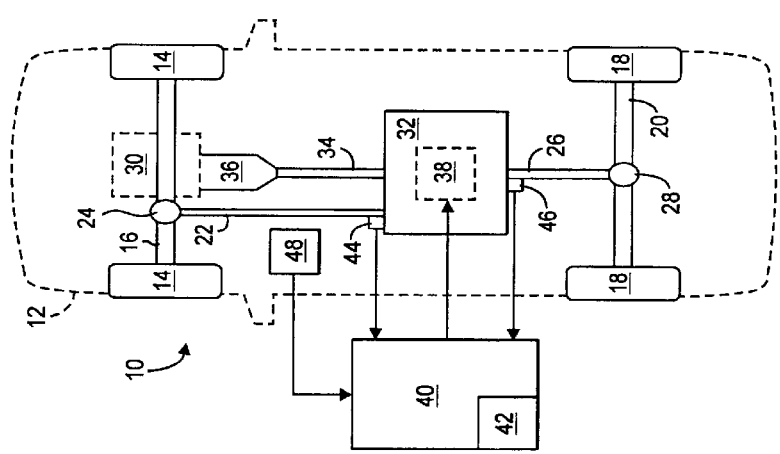
FIG. 1 is a schematic diagram of a four-wheel drive vehicle including a control system which incorporates the teachings of the preferred embodiment of the invention and which is deployed on a vehicle.

Referring now to FIG. 1, there is shown a transfer case control system or apparatus 10 made in accordance with the teachings of the preferred embodiment of the invention. As shown, system 10 is deployed upon a four-wheel drive vehicle having a pair of front wheels 14 which are operatively mounted upon a front axle 16, a pair of rear wheels 18 which are operatively mounted upon a rear axle 20, and a conventional selectively positionable steering wheel (not shown) which is used to selectively steer the vehicle 12. Front axle 16 is operatively coupled to and receives torque and power from a front driveshaft 22 through a front differential assembly 24, and rear axle 20 is operatively coupled to and receives torque and power from a rear driveshaft 26 through a rear differential assembly 28.

Front and rear driveshafts 22, 26 selectively receive torque and power from the vehicle's engine 30 through the transfer case, 32. Particularly, torque generated by the engine 30 is delivered to transfer case 32 through an input shaft 34 which is coupled to the transmission system or assembly 36. Rear driveshaft 26 is coupled to the transmission assembly 36 and continuously receives torque from the input shaft 34. Transfer case 32 includes a conventional electromagnetic clutch assembly 38 which selectively transfers torque to the front driveshaft 22, thereby reducing the torque supplied to the rear driveshaft 26. In the preferred embodiment of the invention, clutch assembly 38 is a conventional "on-demand" type clutch assembly. It should be appreciated that the terms "front" and "rear" are used herein for convenience purposes only (e.g., to respectively refer to a secondary and primary driveshaft), and in alternate embodiments of the invention, the front and rear driveshafts may be interchanged (e.g., the front driveshaft may act as the. primary driveshaft).

Transfer case control system 10 includes a conventional microcontroller or controller 40 having a memory unit 42 and operating under stored program control. Controller 40 is electrically, physically, and communicatively coupled to sensors 44, 46, 48 and to clutch assembly 38. Controller 40 receives signals generated by sensors 44–48, processes and utilizes the received signals to determine the amount of torque which is to be respectively provided to front and rear driveshafts 22, 26, and based upon this determination, generates a command signal to selectively activate the clutch assembly 38, thereby providing torque to and smoothly releasing torque from the front driveshaft 22 and/or rear driveshaft 26.

In the preferred embodiment, controller 40 is a conventional powertrain controller including one or more microprocessors and subprocessors which cooperatively perform the below-described calculations, subroutines and/or processes. Controller 40 generates a pulse-width-modulated ("PWM") signal which controls the amount of slippage between plates of the clutch assembly 38, thereby controlling the amount of torque and power which is transferred to front driveshaft 22 and the rear driveshaft 26 from the input shaft 34. Particularly, the duty cycle percentage of the PWM signal (i.e., the amount or percentage of a signal period in which the signal is active or "enabled") controls the amount of torque which is being transferred to the respective driveshafts 22, 26. The output signal of the controller 40 to the clutch assembly 38 is discussed interchangeably herein as a "duty cycle" output and/or as "torque" output signal.

In the preferred embodiment of the invention, memory 42 is a conventional memory unit including both permanent and temporary memory, and is adapted to and does store at least a portion of the operating software which directs the operation of controller 40. Moreover, memory 42 is adapted to selectively store other types of data or information, including information associated with the operation of the preferred embodiment of the invention and/or associated historical data, processing data, and/or operational data. As will be more fully discussed below, examples of such data include, but are not limited to, data relating to the speed of driveshafts 22, 26, throttle position values, steering wheel angle or position values, and other vehicle operating data, which are used by controller 40 to determine the amount of torque that should be provided to driveshafts 22, 26. Memory 14 also stores various threshold values which are utilized to calculate a steering wheel angle "boost torque" or minimum duty cycle and other minimum duty cycle values. These values are preferably held within one or more matrixes or database tables which are stored within memory 42. As should also be apparent to those of ordinary skill in the art, controller 40 and memory 42 may actually comprise several commercially available, conventional, and disparate chips or devices, which are operatively and communicatively linked in a cooperative manner.

Sensors 44 and 46 comprise conventional and commercially available sensors which respectively measure the rotational speed of the front driveshaft 22 and the rear driveshaft 26, and which respectively generate and communicate signals representing each of these measured speeds to controller 40. Sensors 48 comprise conventional and commercially available vehicle operating condition sensors, and in the preferred embodiment, sensors 48 comprise at least one conventional steering wheel angle or position sensor which measures and/or detects the angle or position of the vehicle's steering wheel and which transmits a signal representing this value to controller 40. In the preferred embodiment, sensors 48 further comprise a throttle position sensor which measures and/or detects the position of the vehicle's throttle and which transmits a signal representing this position to controller 40. Sensors 48 may also include one or more conventional engine or vehicle speed and/or acceleration sensors, and one or more "fault" detection sensors, which detect faults or abnormalities in the operation of engine 30 and/or in the operation of the other components of vehicle 12.

Sensors 44–48 provide data representing the above-delineated measured values to controller 40, which utilizes these values, as discussed more fully and completely below; to generate a PWM signal to transfer case 32 and/or clutch assembly 38, thereby selectively controlling the power and torque which is provided to driveshafts 22 and 26. It should be appreciated that sensors 44–48 may include filtering and/or processing devices or circuits (e.g., low pass, high pass, and/or band pass filters) which filter and/or process the measured or sensed data prior to sending the data to controller 40.

Figure 2:
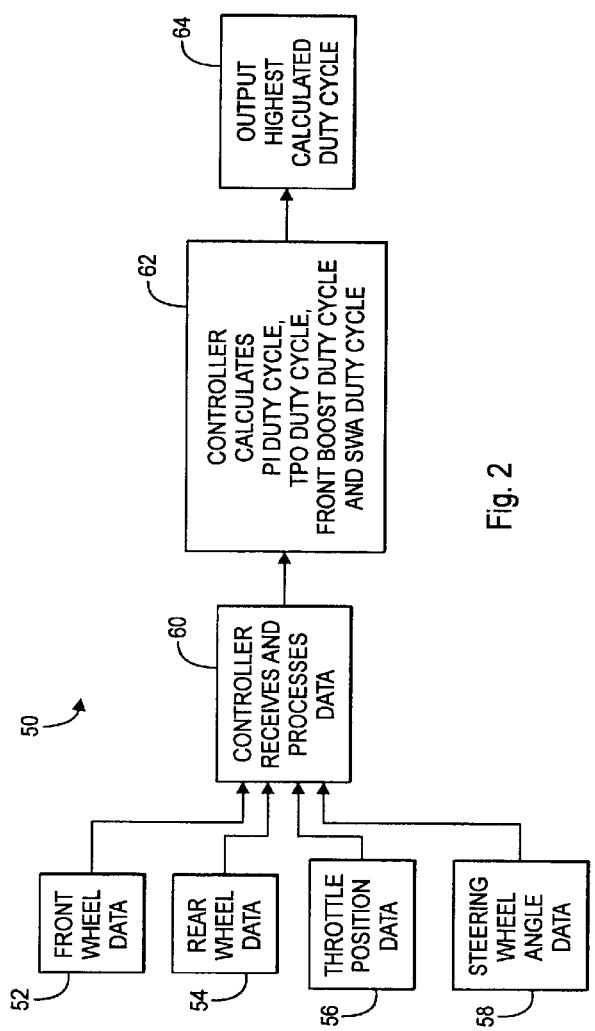
FIG. 2 is a block diagram illustrating the general functionality of the control system shown in FIG. 1.

To understand the general operation of system 10, reference is now made to flow chart 50 of FIG. 2, illustrating the general functionality of system 10. As shown, data 52 represents the speed of the front wheels 14, which is derived in a known manner from the measurements taken by sensor 44. Particularly, controller 40 processes drive shaft speed data received from sensor 44 and uses conventional algorithms and/or equations to determine and/or estimate the speed of the vehicle's front wheels 14. Data 54 represents the speed of the rear wheels 18, which is derived in a known manner from the measurements taken by sensor 46 (i.e., in a manner substantially identical to that described with respect to data 52). Data 56 represents data relating to and/or representing the current position of the vehicle's throttle which is measured and/or processed by sensors 48. Data 58 represents data relating to and/or representing the angular position of the vehicle's steering wheel which is measured and/or processed by sensors 48. In one non-limiting embodiment, vehicle 12 does not include a steering wheel angle sensor, and an inferred steering wheel angle is calculated using a pair of front wheel speed sensors, as described more fully and completely below.

As illustrated in block 60, the controller 40 receives and processes the data 52–58 and selectively transmits or enters this data into a conventional proportional and integral ("PI") torque control strategy (e.g., a strategy which provides a transfer case clutch torque command or minimum duty cycle based upon a proportional and integral component of the difference between the front and rear shaft speeds); a conventional throttle position strategy (e.g., a strategy which provides a transfer case clutch torque command or minimum duty cycle based upon the position of the vehicle's throttle); a front boost strategy (e.g., a strategy which provides a transfer case clutch torque command or minimum duty cycle for situations where the front wheel speed "overruns" the rear wheel speed); and a steering wheel angle strategy which provides a transfer case clutch torque command or a minimum duty cycle "swa_min_duty_cycle" based upon the angle of the vehicle's steering wheel, as shown in functional block or step 62 and as described more fully and completely below.

Controller 40 then utilizes an "arbitrating" subroutine or strategy to determine which of the generated and/or calculated duty cycle values (i.e., the PI duty cycle value, the throttle position ("TPO") duty cycle value, the front boost duty cycle value, and the steering wheel angle ("SWA") duty cycle value) is highest (i.e., in percentage) and outputs the highest of torque or duty cycle values to the transfer case 32 and/or clutch assembly 38, as illustrated in functional block or step 64. The torque command or duty cycle causes the clutch assembly 38 to alter or control the amount of torque which is being provided to the front and rear driveshafts, thereby preventing slippage between wheels 14 and 18, and providing additional traction to wheels 14 and 18 when the vehicle experiences a potential "slip condition". In other non-limiting embodiments, other minimum duty cycle values may be calculated based upon other vehicle operating conditions and may be compared with the foregoing duty cycle values to determine a highest duty cycle value.

In the preferred embodiment of the invention, controller 40 utilizes vehicle speed, throttle position and the steering wheel angle to determine the swa_min_duty_cycle. Particularly, the swa_min_duty_cycle is determined as follows:

if ((tpo_duty_cycle_percent<swa_tpo_cutout_thresh) and (vehicle speed<swa_spd_cutout_thresh)) then
swa_min_duty_cycle=swa_cutout_clutch_dc;
else
swa_min_duty_cycle=f(steering wheel angle, vehicle speed), where tpo_duty_cycle_percent is the minimum duty cycle determined by the throttle position strategy; vehicle speed is the speed of the vehicle as determined by the "slower" turning of the two driveshafts 22, 26; and swa_tpo_cutout_thresh, swa_spd_cutout_thresh, and swa_cutout_clutch_dc are calibratable values that are established through data that is acquired from testing the type of vehicle and/or transfer case which is being controlled. In one non-limiting embodiment, swa_tpo_cutout_thresh is approximately 11%, swa_spd_cutout_thresh is approximately 14 kilometers per hour ("kph"), and swa_cutout_clutch_dc is approximately 1%.

Figure 3:
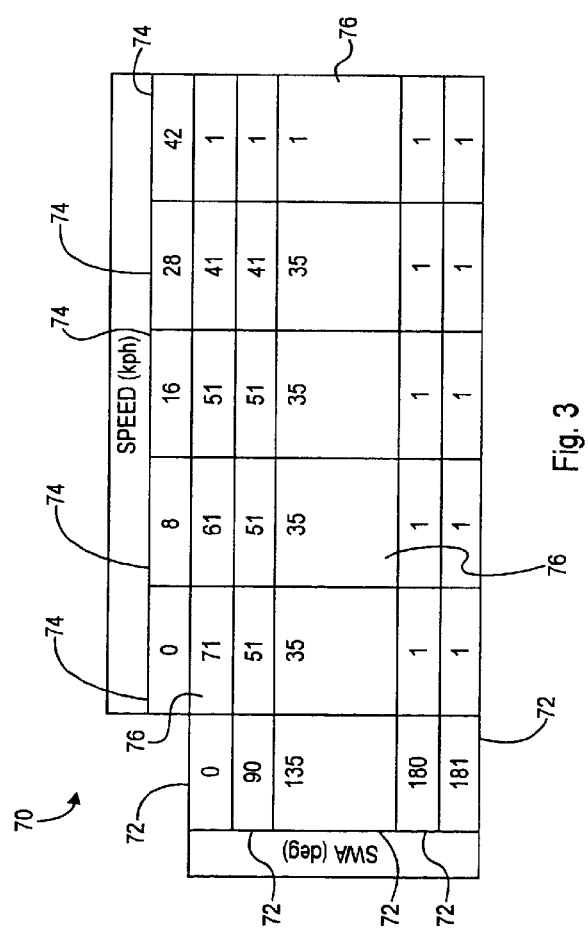
FIG. 3 is a non-limiting embodiment of a database table which is used by the system shown in FIG. 1 to determine a minimum duty cycle value.

In the preferred embodiment, when swa_min_duty_cycle is calculated as a function of steering wheel angle and vehicle speed (i.e., when swa_min_duty_cycle=f(steering wheel angle, vehicle speed)), a matrix, database table, or "look-up" table is used to determined the value of swa_min_duty_cycle. One non-limiting example of such a table 70 is illustrated in FIG. 3. As shown, table 70 includes several rows 72, which correspond to various ranges of steering wheel angles in degrees (e.g., 0–89, 90–134, 135–179, 180, and 181), and several columns 74 which correspond to various ranges of vehicle speeds in kph (e.g., 0–7, 8–15, 16–27, and 28–42). The steering wheel angle values refer to the absolute value of the steering wheel angle signal, and therefore, positive angles are treated the same as negative angles in the present strategy. Table 70 contains various values 76 which correspond to percentages for the swa_min_duty_cycle. The current measured vehicle speed and the current measured steering wheel angle are used to "reference" the matrix or database table 70, thereby providing a unique one of values 76 which is used for the swa_min_duty_cycle.

In an alternate embodiment of the present invention, when swa_min_duty_cycle is calculated as a function of steering wheel angle and vehicle speed (i.e., when swa_min_duty_cycle=f(steering wheel angle, vehicle speed)), a linear approximation or equation is used to determined the value of swa_min_duty_cycle. Particularly, swa_min_duty_cycle is determined as follows:

if V<swa_min_spd_thresh, then
swa_min_duty_cycle=swa_min_slope_down*(SWA+(swa_spd_const_L*V))+swa_min_maxlimit,
if V>=swa_min_spd_thresh, then
swa_min_duty_cycle=swa_min_slope_down*(SWA+(swa_spd_const_H*V))+swa_min_maxlimit, and
if swa_min_duty_cycle<1%, then
swa_min_duty_cycle=swa_cutout_clutch_dc, where V is the vehicle speed, as determined by the slower turning of the two driveshafts 22, 26; SWA is the absolute value of the steering wheel angle in degrees; and swa_min_slope_down, swa_min_maxlimit, swa_spd_const_L, swa_spd_const_H and swa_cutout_clutch_dc are calibratable values that are established through data that is acquired from testing the type of vehicle and/or transfer case which is being controlled. In one non-limiting embodiment, swa_min_slope_down is approximately 0.19%/deg, swa_min_maxlimit is approximately 65%, swa_spd_const_L is approximately 2, swa_spd_const_H is approximately 5, and swa_cutout_clutch_dc is approximately 1%.

It should be appreciated that the foregoing steering wheel angle position strategy (e.g., the use of the swa_min_duty_cycle) is effective to preempt wheel slip by "boosting" the clutch (i.e., the minimum clutch duty cycle) in situations where the vehicle is not engaged in a turn. In certain non-limiting embodiments, a period of time may exist in which the system 10 has not yet "learned" the true steering wheel angle by determining the steering center position (e.g., embodiments using a relative steering wheel angle sensor). In such embodiments, the steering wheel angle strategy is disabled (e.g., swa_min_duty_cycle is set to 1%) until the steering wheel center position is determined. In other embodiments, an "absolute" steering wheel angle sensor is used and system 10 always "knows" the center position.

In a second embodiment of the invention, an inferred steering wheel angle is calculated by system 10. This inferred steering wheel angle or "iSWA" is used as the steering wheel angle (SWA) within the various strategies described herein for vehicles that do not include a conventional steering wheel angle sensor, or for vehicles having a steering wheel angle sensor but which have not yet "found center". In one embodiment, system 10 includes an arbitrator which compares the sensor-derived SWA with the iSWA and uses the lower of the two values within the various strategies described herein.

Figure 4:
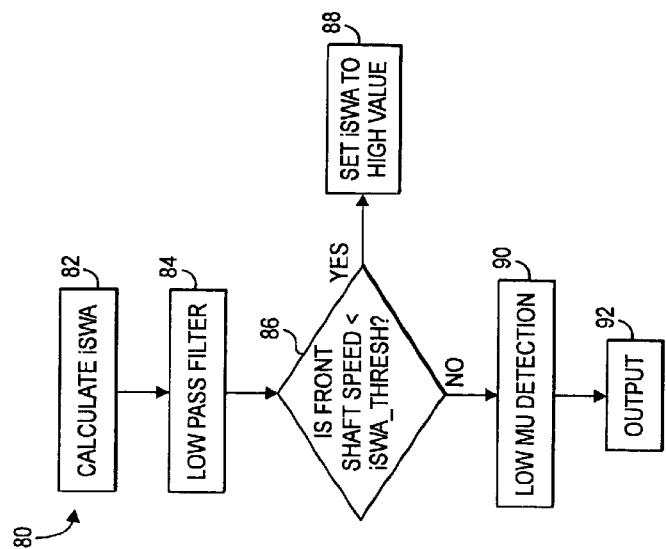
FIG. 4 is a block diagram illustrating one non-limiting embodiment of a method used to calculate an inferred steering wheel angle which is used in an alternate embodiment of the present invention.

Referring now to FIG. 4, there is shown a block diagram 80 illustrating the preferred method of generating and/or determining the iSWA. In step 82, an iSWA is first is calculated by use of the following equation:

iSWA=(|delta_front_wheel_speed|/front_shaft_speed)*iSWA_conversion_constant where delta_front_wheel_speed is the difference between the measured speed of the right front wheel of the vehicle minus the measured speed of the left front wheel of the vehicle (in the this embodiment, system 10 includes conventional sensors capable of independently measuring the speeds of each front wheel); front_shaft_speed is the measured speed of the front driveshaft 22; and the iSWA_conversion_constant is a selectively calibratable constant which, in one non-limiting embodiment, is equal to approximately 1800. It should be appreciated that the above strategy infers steering wheel angle based on the principle that the outer front wheel spins faster than the inner front wheel during a turn. When the vehicle is in a "tight" or "sharp" turn, the delta_front_wheel_speed will be relatively high, and the calculated iSWA will be relatively high.

In functional block or step 84, the calculated iSWA value or signal is subjected to a conventional low pass filter to remove transients. In functional block or step 86, controller 40 determines whether the front shaft speed is less than a certain threshold value (i.e., iSWA speed_thresh), which, in one non-limiting embodiment, is equal to approximately 5 kph. If the front shaft speed is less than iSWA_speed_thresh ("iSWA_thresh"), controller 40 proceeds to step 88 and iSWA is set to a predetermined "high value" which in one non-limiting embodiment is equal to 500 degrees. It should be appreciated that these steps (i.e., steps 86, 88) prevent the calculated iSWA from being used in conditions where reliable front wheel data is not available (e.g., in conditions where the vehicle is moving very slowly). In such cases, the iSWA strategy terminates with step 88 and the predetermined "high value" is used as the iSWA.

If the front shaft speed exceeds the iSWA_speed_thresh value, the iSWA signal is further subjected to a "low mu detection" algorithm as shown in step 90. In the preferred embodiment, controller 40 examines the iSWA signal to determine whether the values are "too high" (e.g., when the vehicle is on a low friction surface). Particularly, controller 40 compares the iSWA signal to a calibratable threshold value (iSWA_excess_slip_thresh) and if the iSWA signal exceeds iSWA_excess_slip_thresh, controller 40 sets the iSWA value to a calibratable value (iSWA_excess_slip_value) for a calibratable period of time (iSWA_excess_slip_duration). In one non-limiting embodiment, iSWA_excess_slip_thresh is approximately 1000 degrees; iSWA_excess_slip_value is approximately 5 degrees; and iSWA_excess_slip_duration is approximately 100 milliseconds (msec). In step 92, controller 40 outputs either the iSWA_excess_slip_value or the current calculated and filtered iSWA value as the iSWA which is used for the strategies described herein (e.g., in place of the SWA).

In alternate embodiments of the present invention, the SWA and/or iSWA are used in other portions of the vehicle's slip control strategy. For example and without limitation, in one alternate embodiment, the SWA is used within the slip control PI algorithm. In this embodiment, the PI minimum duty cycle signal y(k) is calculated by use of the following equation:

$$y(k)=Y_i(k)+Y_p(k)$$

where k represents the current iteration of the calculation, $Y_i(k)$ is the "integral" term or component, and $Y_p(k)$ is the "proportional" term or component. The integral term is derived by use of the following equation:

$$Y_i(k)=Y_i(k-1)+[T*K_i]*e(k)$$

where T represents the time interval between iterations of the calculation, $K_i$ is equal to an integral gain constant, and e(k) is equal to the delta shaft speed (i.e., the difference between the speed of the rear driveshaft 26 and the speed of the front driveshaft 22) minus an "allowable slip" factor. The proportional term is calculated by use of the following equation:

$$Y_p(k)=K_p*e(k)$$

where $K_p$ is equal to a proportional gain constant.

In this non-limiting embodiment, $K_i$ is set or made equal to one or more "down" gain values "$K_i$_down" if e(k) is less than zero, which indicates that the torque provided to the front driveshaft 22 should be reduced, and is set or made equal to one or more "up" gain values "$K_i$_up" if e(k) is greater than zero, which indicates the torque provided to front driveshaft 22 should be increased. By selectively using separate proportional gain constant values $K_i$_up and $K_i$_own, system 10 is able to substantially reduce NVH problems without compromising response time of the system. It should be appreciated that the $K_p$ value may be similarly varied to further improve the slip control strategy.

In this non-limiting embodiment, the SWA signal is used to selectively vary the $K_i$_down constant, in a manner which reduces the rapid cycling of the clutch by slowing the integral "down" portion of the clutch duty cycle signal when the vehicle 12 is engaged in a "sharp" turn. Particularly, controller determines and/or calculates $K_i$_down as a function of vehicle speed (as determined by the slower turning of the two driveshafts 22, 26), the current $Y_i(k)$ value, and the SWA (e.g., $K_i$_down=f(vehicle speed, YI, SWA)).

Figure 5:
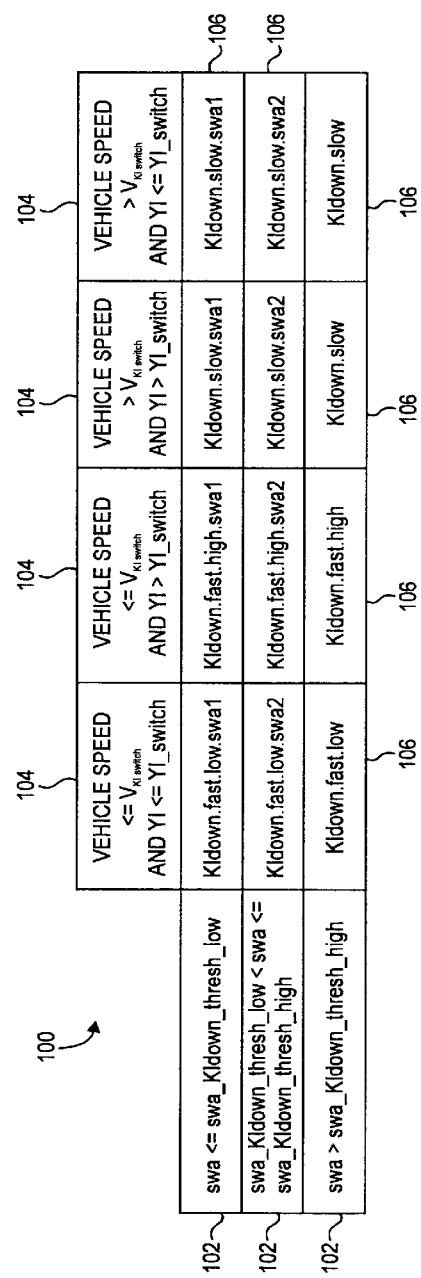
FIG. 5 is a non-limiting embodiment of a database table which is used by an alternate embodiment of the present invention to determine an integral gain constant.

In one non-limiting embodiment, a matrix, database table, or "look-up" table is used to determined the value of $K_i$_down. One non-limiting example of such a table 100 is illustrated in FIG. 5. As shown, table 100 includes several rows 102, which correspond to various ranges of steering wheel angles (swa) in degrees, and several columns 104 which correspond to various ranges of vehicle speeds in kph and various ranges of $Y_i(k)$ values. The steering wheel angle (swa) values refer to the absolute value of the steering wheel angle signal, and therefore, positive angles are treated the same as negative angles in the present strategy. Table 100 contains various values 106 which correspond to values for the $K_i$_down constant. The current measured vehicle speed, the $Y_i(k)$ value, and the current measured (or inferred) steering wheel angle are used to "reference" the matrix or database table 100, thereby providing a unique value 106 which is used for the $K_i$_down. The values swa_KIdown_thresh_low, swa_KIdown_thresh_high, $V_{KIswitch}$, $YI_{switch}$ and all of the values 106 are each calibratable and may be based on the specific vehicle in which the present algorithm is used. In one non-limiting embodiment, swa_KIdown_thresh_low is approximately 90 degrees; swa_KIdown_ thresh_high is approximately 180 degrees; KIdown,fast,high,swa1 and KIdown,fast,low,swa1 are approximately 2%; KIdown,fast,high,swa2 and KIdown,fast,low,swa2 are approximately 3%; KIdown,slow,swa1 is approximately 1%; and KIdown,slwo,swa2 is approximately 1.5%.

In another alternate embodiment of the present invention, the SWA (or iSWA) is used to modify values held within a rear slip table in order to account for the principle that when a vehicle is engaged in a turn, the front wheels naturally tend to spin faster than the rear wheels. The amount of this natural "overrun" is substantially proportional to the SWA.

In this embodiment, a rear slip control signal is generated when the delta shaft speed is positive (e.g., when the speed of the rear driveshaft 26 exceeds the speed of the front driveshaft) 22 and exceeds an allowable rear slip margin or factor. This slip control signal is effective to provide a "torque boost" to the clutch to avoid potential slip conditions. This embodiment may also include a front slip control signal which is generated when the speed of the front driveshaft 22 exceeds the speed of the rear driveshaft 26 (i.e., the delta shaft speed is negative) by a front slip margin or factor. In an alternate embodiment, the SWA is used to modify values within the front slip table in a similar manner.

The rear slip margins or factors are stored within a rear slip table or matrix which is held within memory 42. The table or matrix includes a plurality of "slip" margin values (e.g., speed values). Each of the "slip" values corresponds to a particular front or rear shaft speed value or range of values, and each represents an amount of relative slip which is considered "allowable" at that particular speed or range of speeds. In the preferred embodiment of the invention, the current rear shaft speed is used to index or "reference" a column of the rear slip table containing one or more allowable slip margin values. In one non-limiting embodiment, the rear slip table is also referenced using a selectively variable "ratchet_index" value which provides the row in which the rear slip value is selected.

In the present embodiment, the SWA (or iSWA) is used to selectively modify (i.e., reduce) the rear slip margins to account for the natural "overrun" of the front wheels in situations where the vehicle is engaged in a turn. Particularly, when using the present strategy, a new or "final" rear slip table is created by decreasing each of the values within the rear slip margin table by an SWA rear slip modifier (swa_Rslip_mod). In one non-limiting embodiment, the value of this modifier varies based upon the SWA and the speed of the vehicle.

Figure 6:
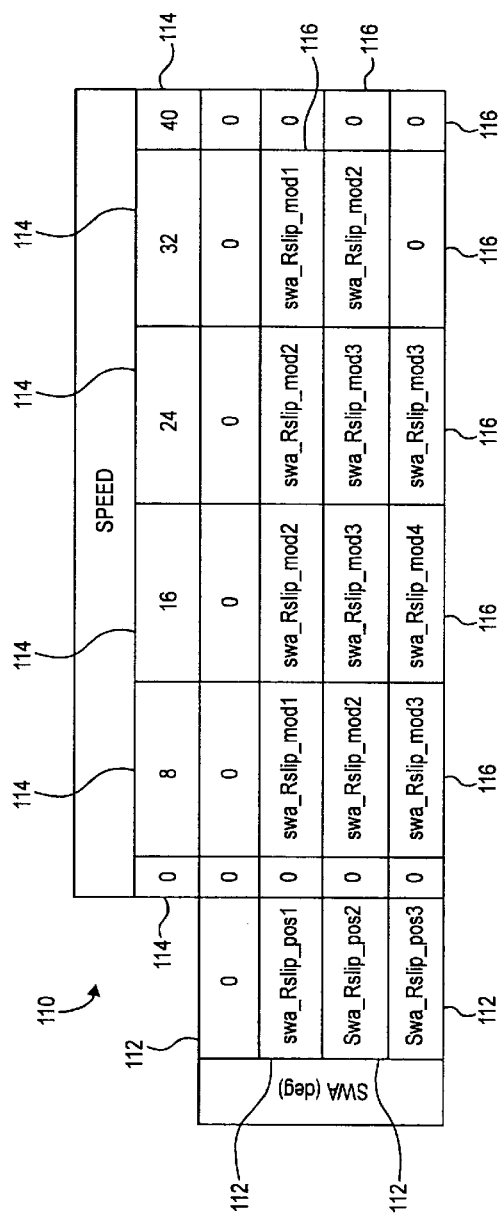
FIG. 6 is a non-limiting embodiment of a database table which is used by an alternate embodiment of the present invention to determine a rear slip margin modifier.

In one non-limiting embodiment, a matrix or "look-up" table is used to determined the value of swa_Rslip_mod. One non-limiting example of such a table 110 is illustrated in FIG. 6. As shown, table 110 includes several rows 112, which correspond to various ranges of steering wheel angles (SWA) in degrees, and several columns 114 which correspond to various ranges of vehicle speeds in kph. The steering wheel angle (SWA) values refer to the absolute value of the steering wheel angle signal, and therefore, negative angles are treated the same as positive angles in the present strategy. Table 110 contains various values 116 which correspond to values for the swa_Rslip_mod modifier. The current measured vehicle speed, and the current measured (or inferred) steering wheel angle are used to "reference" the matrix or database table 110, thereby providing a unique value 116 which is used for the swa_Rslip_mod value. The values swa_Rslip_pos1, swa_Rslip_pos2, swa_Rslip_pos3, swa_Rslip_mod1, swa_Rslip_mod2, swa_Rslip_mod3 and swa_Rslip_mod4 are each selectively calibratable and may be based on the specific vehicle in which the present algorithm is used. In one non-limiting embodiment, swa_Rslip_pos1, swa_Rslip_pos2, and swa_Rslip_pos3 are respectively equal to 180 degrees, 270 degrees, and 360 degrees; and swa_Rslip_mod1, swa_Rslip_mod2, swa_Rslip_mod3 and swa_Rslip_mod4 are respectively equal to 0.125, 0.1875, 0.4375, and 0.8125.

It is understood that the various inventions are not limited to the exact construction illustrated and described above, but that these previously delineated inventions may be varied without departing from the scope of the inventions as described in the following claims.

What is claimed is:

1. A system for controlling a transfer case which is operatively disposed within a four-wheel drive vehicle which is operated at a certain speed and which is of the type having a steering wheel and a primary and a secondary driveshaft, said transfer case being effective to selectively transfer torque between said primary and secondary driveshafts, said system comprising:

at least one sensor which senses an angle in which said steering wheel is positioned and which generates at least one signal representing said sensed angle; and a controller which is communicatively coupled to said transfer case and to said sensor, which receives said at least one signal, and which utilizes said at least one signal to selectively generate an output signal having a minimum duty cycle value and which is based upon said sensed angle and said certain speed of said vehicle and which is effective to selectively control said torque which is transferred to said primary and secondary driveshafts effective to preemptively prevent slip from occurring as the vehicle is traveling without turning.

2. The system of claim 1 wherein said at least one sensor comprises a steering wheel angle sensor.

3. The system of claim 1 further comprising a first driveshaft speed sensor which senses a speed of said primary driveshaft, and a second driveshaft speed sensor which measures a speed of said secondary driveshaft.

4. The system of claim 1 wherein said controller selects a value for said output signal by referencing a database table.

5. The system of claim 1 wherein said output signal is determined by use of a proportional and integral control algorithm including an integral gain constant, and wherein said controller selectively varies said integral gain constant based upon said sensed angle.

6. The system of claim 1 wherein said output signal is determined by use of a rear slip margin table containing a plurality of values, and wherein said controller selectively varies said plurality of values based upon said sensed angle.

7. A method for controlling a transfer case which is operatively disposed within a four wheel drive vehicle of the type having a selectively positionable steering wheel, a selectively positionable throttle, a front driveshaft and a rear driveshaft which operate at respective speeds, said transfer case being adapted to selectively provide torque to said front and rear driveshafts, said method comprising the steps of:

calculating a first duty cycle value by use of said position of said throttle;

calculating a second duty cycle value by use of said speeds of said front and rear drive shafts;

calculating a third front boost duty cycle value; and determining an angular position of said steering wheel;

using said angular position to determine a fourth duty cycle value;

comparing said calculated duty cycle values;

identifying the largest of said compared duty cycle values and selectively providing said largest duty cycle value to said transfer case, said largest duty cycle value being effective to alter said torque provided to said front and rear driveshafts.

8. The method of claim 7 wherein said angular position is determined by use of a steering wheel angle sensor.

9. The method of claim 7 wherein angular position is an inferred angular position which is determined by use of a first front wheel speed sensor which measures a first speed of a first front wheel of said vehicle, and a second front wheel speed sensor which measures a second speed of a second front wheel of said vehicle.

10. The method of claim 9 further comprising the steps of:

calculating a delta front wheel speed by subtracting said first speed from said second speed;

measuring a third speed of said front driveshaft; and causing said inferred angular position to be equal to the absolute value of said delta front wheel speed divided by said third speed and multiplied by a predetermined constant.

11. The method of claim 7 further comprising the steps of:

measuring a speed of said vehicle; and using said measured speed along with said angular position to calculate said minimum duty cycle value.

12. The method of claim 7 wherein said minimum duty cycle value is determined using a proportional and integral control algorithm including an integral gain constant, and wherein said integral gain constant is selectively varied based upon said angular position.

13. The method of claim 7 wherein said minimum duty cycle value is determined using a slip margin table containing a plurality of values, said method further comprising the step of:

selectively varying said plurality of values based upon said angular position.

14. A method for estimating an angle of a steering wheel of a vehicle having a first front wheel and a second front wheel, said method comprising the steps of:

measuring a first speed of said first front wheel;

measuring a second speed of said second front wheel;

subtracting said first speed from said second speed to obtain a delta front wheel speed;

dividing said delta front wheel speed by a third speed of said vehicle to obtain a first value; and multiplying said first value by a conversion constant, thereby obtaining an estimate of said angle of said steering wheel.

15. The method of claim 14 wherein said vehicle includes a front driveshaft, and wherein said third speed is determined by measuring a speed of said front driveshaft.

16. The method of claim 14 wherein said conversion constant is approximately 1800.

17. The method of claim 14 further comprising the step of:

subjecting said estimate to a low pass filter.

18. The method of claim 17 wherein said estimate is selectively used within a transfer case control algorithm, said method further comprising the steps of:

determining whether said third speed is less than a threshold value; and using said estimate within said transfer case control algorithm only if said third speed is not less than said threshold value.

19. The method of claim 18 further comprising the steps of:

using a predetermined steering wheel angle value within said transfer case control algorithm if said third speed is less than said threshold value.

* * * * *